UNITED STATES PATENT OFFICE.

WILHELM BERGDOLT, OF LEVERKUSEN, NEAR COLOGNE, GERMAN, ASSIGNOR TO FARBENFABRIKEN VORM. FRIEDR. BAYER & CO., OF ELBERFELD, GERMANY, A CORPORATION OF GERMANY.

BROWN AZO DYE.

1,009,952.  Specification of Letters Patent.  Patented Nov. 28, 1911.

No Drawing.  Application filed July 6, 1911. Serial No. 637,157.

*To all whom it may concern:*

Be it known that I, WILHELM BERGDOLT, doctor of philosophy, chemist, citizen of the German Empire, residing at Leverkusen, near Cologne, Germany, have invented new and useful Improvements in Brown Azo Dye, of which the following is a specification.

I have found that new and valuable azo dyes having most probably the formula:

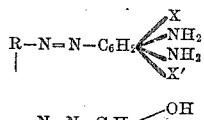
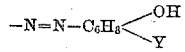

(R=an aryl *e. g.* $C_6H_4-$, $-C_6H_3-NO_2$, $-C_6H_3-CH_3$, $-C_6H_3-OCH_3$; X=H or $SO_3H$; X'=H or $CH_3$; Y=H or OH) can be obtained by combining the tetrazo compounds of a para-diamin of the benzidin series such as benzidin, tolidin, nitrobenzidin, dianisidin, with one molecule of a diamin *e. g.* toluylenediamin, meta-phenylenediamin, meta-phenylenediamin sulfonic acid and one molecule of a phenol such as phenol or resorcin.

The new dyes are brown powders yielding upon treatment with stannous chlorid and hydrochloric acid a diamino-diaryl compound, a triamin of the benzene series and an aminophenol. Very valuable yellowish brown shades fast to washing are obtained by treating with diazotized nitranilins cotton dyed with these new dyes. The shades thus obtained are especially valuable for the reason that they can be remarkably well discharged to a pure white.

In order to illustrate the new process more fully I give the following example, the parts being by weight:—22.9 parts of nitrobenzidin are tetrazotized with 14 parts of sodium nitrite and hydrochloric acid. The excess of free acid is neutralized with carbonate of sodium and to the diazo solution at 0° a solution of 21.5 parts of the sodium salt of meta-phenylenediamin sulfonic acid is added. After the addition of soda the mixture is stirred until the intermediate compound is produced and then a solution of 9.8 parts of phenol in 40 parts of a sodium carbonate solution is added thereto. The mixture is stirred during about 10 hours, the dye is salted out, filtered off, and dried. It is a brown powder having most probably the formula:

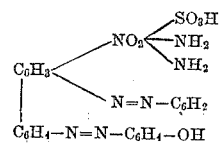

soluble in water with a yellow color, yielding upon reduction with stannous chlorid and hydrochloric acid triaminodiphenyl, 1.3.6-triaminobenzene-4-sulfonic acid and para-aminophenol.

I claim:—

The herein described new tetrazodyes obtainable from paradiamins, diamins, and phenol substances which are brown powders yielding upon reduction with stannous chlorid and hydrochloric acid a diaminodiaryl compound, a triamin and an aminophenol, furnishing yellowish-brown shades fast to washing which can be well discharged by treating cotton dyed with these dyes with diazotized nitranilins, substantially as described.

In testimony whereof I have hereunto set my hand in the presence of two subscribing witnesses.

WILHELM BERGDOLT. [L. S.]

Witnesses:
CHAS. J. WRIGHT,
ALBERT F. NUFER.

It is hereby certified that in Letters Patent No. 1,009,952, granted November 28, 1911, upon the application of Wilhelm Bergdolt, of Leverkusen, near Cologne, Germany, for an improvement in "Brown Azo Dye," an error appears in the printed specification requiring correction as follows: Lines 56–62, formula, for

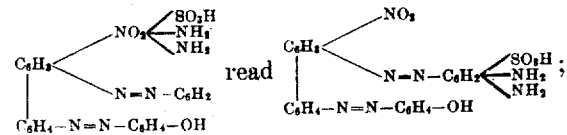

and that the said Letters Patent should be read with this correction therein that the same may conform to the record of the case in the Patent Office.

Signed and sealed this 6th day of February, A. D., 1912.

[SEAL.]

C. C. BILLINGS,
*Acting Commissioner of Patents.*